United States Patent [19]

Marioni

[11] Patent Number: 5,242,582

[45] Date of Patent: Sep. 7, 1993

[54] AQUARIUM FILTER

[75] Inventor: Elio Marioni, Dueville, Italy

[73] Assignee: Askoll S.p.A., Povolaro Dueville, Italy

[21] Appl. No.: 788,910

[22] Filed: Nov. 7, 1991

[30] Foreign Application Priority Data

Nov. 9, 1990 [IT] Italy .................. 41727 A/90

[51] Int. Cl.5 .................................... B01D 36/02
[52] U.S. Cl. ........................... 210/151; 210/169; 210/258; 210/259; 210/266
[58] Field of Search ............ 210/150, 151, 169, 257.1, 210/258, 259, 266

[56] References Cited

U.S. PATENT DOCUMENTS

| 4,333,893 | 6/1982 | Clyde | 210/150 |
| 4,713,173 | 12/1987 | Goldman et al. | 210/169 |
| 4,915,828 | 4/1990 | Meyers | 210/110 |
| 5,084,164 | 1/1992 | Rosario | 210/151 |

FOREIGN PATENT DOCUMENTS 0244904 11/1987 European Pat. Off. .
2298946 8/1976 France .

Primary Examiner—Ivars Cintins
Attorney, Agent, or Firm—Guido Modiano; Albert Josif

[57] ABSTRACT

Aquarium filter having a box-like body defining a first mechanical filtration region provided with mechanical-action filtration means and a second biological filtration region having a chamber provided with biological-action filtration masses which are crossed in a downward direction by fluid at low speed. The second region is provided, in a downward position, with a collection channel system which is connected to the intake duct of a recirculation pump and with a bypass opening which deflects part of the water arriving from the first region directly into the channel system.

10 Claims, 1 Drawing Sheet

U.S. Patent
Sep. 7, 1993
5,242,582
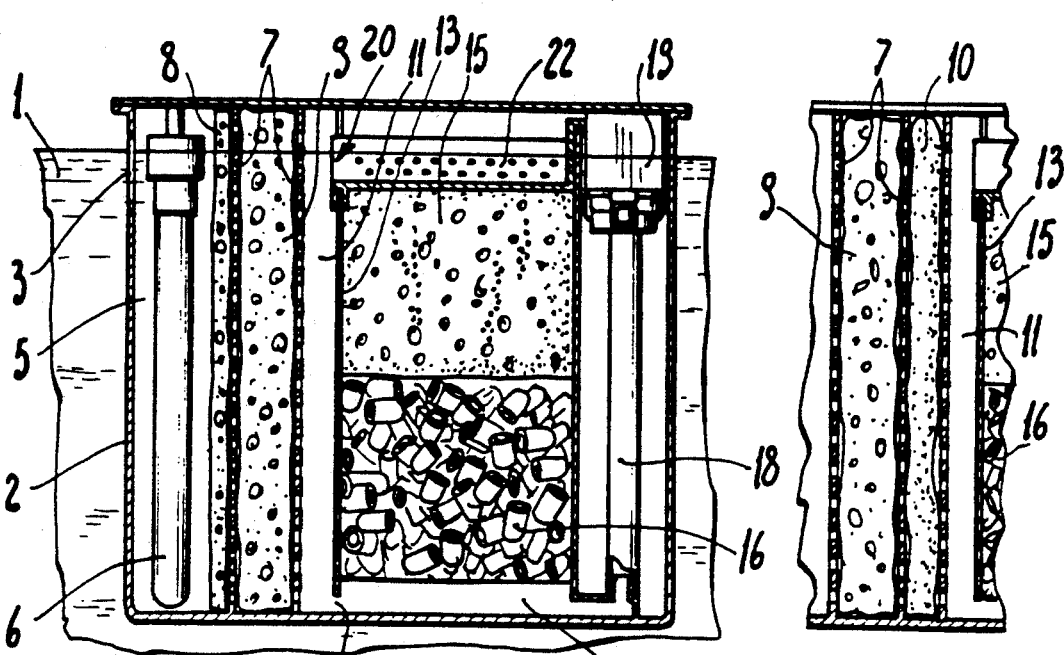
Fig. 1
Fig. 2
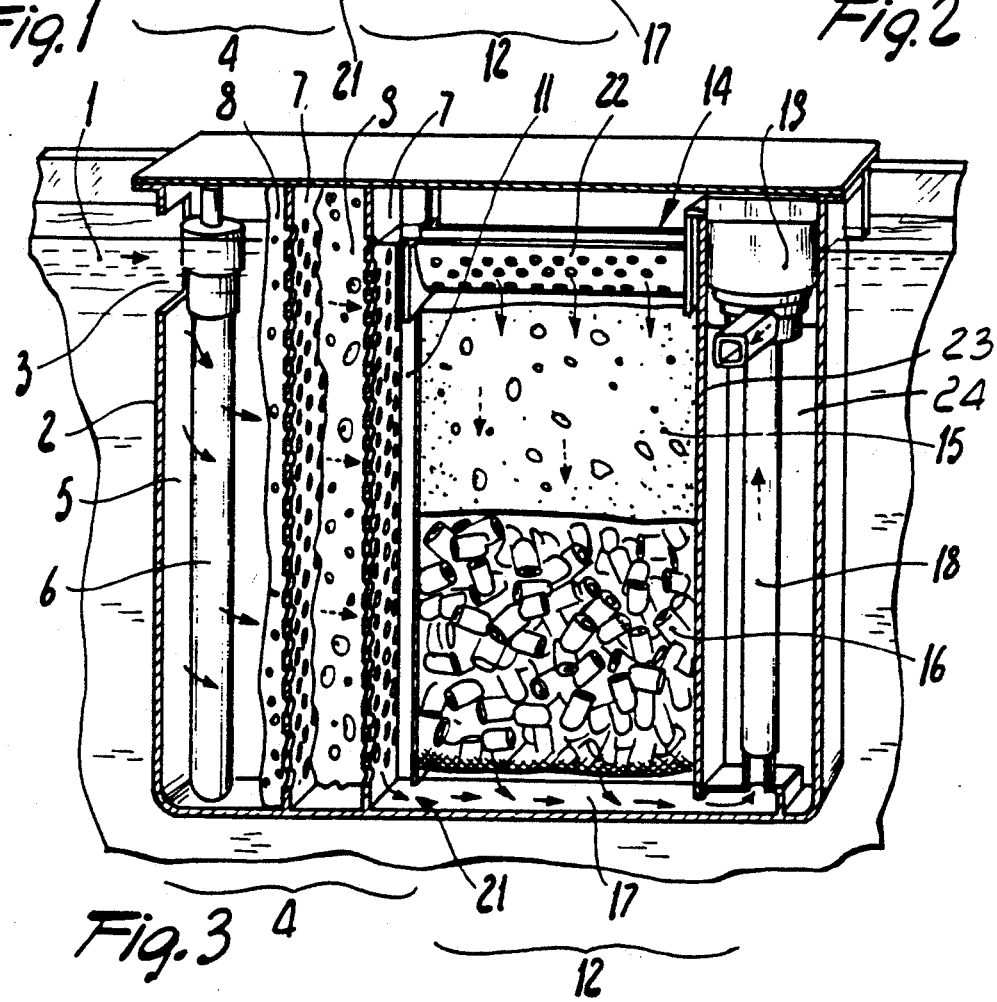
Fig. 3

5,242,582

AQUARIUM FILTER

BACKGROUND OF THE INVENTION

The present invention relates to an aquarium filter.

The filter can be used particularly as an internal filter with biological and mechanical action.

Various types of aquarium filters with biological action, i.e. filters which have a filtration mass suitable for containing a large amount of bacteria for rapidly decomposing the contaminants which form in the water, are currently commercially available.

Said filtration masses are generally constituted by highly porous material suitable for acting as an ideal support for the rapid and abundant settling of bacteria.

Biological filtration requires a low water transit speed in order to allow a better settling of the bacterial flora and a more effective action thereof.

It has furthermore been shown that the bacterial flora, which constitutes the biological filtration medium, is maximally effective and powerful if the water to be purified is placed in contact with a large amount of oxygen.

The presence of a filter with mechanical action is also necessary inside an aquarium; however, the best action of said filter occurs with a high transit speed through the filtration medium.

SUMMARY OF THE INVENTION

The technical-aim of the present invention is to provide an aquarium filter which combines a mechanical filtration action with a biological one.

A consequent primary object is to provide a filter in which the water flows rapidly in the part with mechanical action and slowly in the part with biological action.

Another important object is to provide a filter in the biological-action part of which an air-water exchange occurs.

Another important object is to provide a biological filter which keeps the recirculation pump constantly operating in water, so as to avoid wear, noise and severe damage thereof.

Not least object is to provide a filter which can be manufactured with conventional machines and facilities.

This aim, these objects and others which will become apparent hereinafter are achieved by an aquarium filter comprising a box-like body which defines a first mechanical filtering region provided with mechanical-action filtration masses, and a second biological filtering region having a chamber for biological-action filtration masses which are crossable by fluid in a downward direction, said second region being downwardly provided with a collecting channel system which is connected to an intake duct of a recirculation pump and with a bypass opening which is suitable for deflecting part of the water arriving from the first region directly into said channel system.

Advantageously, said recirculation pump has low head and high capacity characteristics.

BRIEF DESCRIPTION OF THE DRAWINGS

Further characteristics and advantages of the invention will become apparent from the detailed description of an embodiment thereof, illustrated only by way of non-limitative example in the accompanying drawings, wherein:

FIG. 1 is a longitudinal sectional view of the filter according to the invention;

FIG. 2 is a longitudinal sectional view of a further aspect of the filter of the present invention;

FIG. 3 is a sectional perspective view of the filter of FIG. 1.

DESCRIPTION OF THE PREFERRED EMBODIMENTS

With reference to the above figures, the aquarium filter according to the invention, conveniently immersable inside an aquarium 1, comprises a box-like body 2 which is made of plastic material and which has, for example, a parallelepipedal shape.

On one side, said box-like body 2 has an opening 3 which connects to the outside a first region 4 which is horizontally crossed by the water and which comprises a space 5, which is free from filtration masses and in which it is possible to conveniently arrange for example a heater 6 which can be thermostat-controlled.

The first mechanical filtration region 4 has, after the space 5, partitions 7 which are conveniently provided with perforations or meshes so as to allow the flow of water and which are suitable for defining chambers for containing mechanical-action filtration masses.

A first filtration mass, indicated by 8, is constituted by a pre-filter, for example made of coarse pore sponge, whereas a second filtration mass, indicated by 9, is constituted for example by a natural or synthetic sponge.

An additional chamber, arranged after the second mass 9 as seen in FIG. 2, can contain a third filtration mass 10, for example constituted by activated carbon or peat.

An empty chamber 11 is preferably arranged after the filtration masses and is followed by a second biological filtration region 12.

In particular, said second region 12 is comprised between a first partition 13 and a second partition 23 which defines a chamber 14 inside which a first biological-action filtration mass 15, constituted for example by a brick made of porous ceramic or of ceramic sponge, is arranged upwardly, and a second biological-action filtration mass 16, for example constituted by sections of ceramic tubes, is arranged downwardly. Said empty chamber 11 is adjacent said partition 13.

A collecting channel system 17 is defined in the chamber 14 below the second biological-action filtration mass 16 and is connected to the intake tube 18 of a recirculation pump 19 which is arranged in the upper part of said box-like body 2 said intake tube 18 and said recirculation pump 19 being placed in a compartment 24 defined between said second partition and an opposite side of the body 2.

Said partition 13 has only two openings: an upper one 20, suitable for supplying the biological filtration masses, and a gauged lower one 21, suitable for bypassing part of the water contained in the chamber 11 toward the channel system 17.

A distribution means 22 is connected by said upper opening 20 to said first region 4 and is conveniently constituted by a horizontal element which defines a concavity directed upwardly and which forms a channel with perforations which pour water onto the filtration mass 15 with a sort of sprinkler-like effect.

The biological filtration masses are therefore crossed by the water at low speed in a descending direction.

Said recirculation pump 19 conveniently has low head and high capacity characteristics and is therefore considerably influenced by the level which is established in the chamber 14.

The cross-section of the lower bypass opening 21 is gauged so that a level which substantially corresponds to the separating region between the two filtration masses is established in the chamber 14 as a function of the characteristics of the pump 19.

In this manner, there is a very intense air-water-ceramic sponge exchange, and therefore an excellent biological action, in the mass 15 into which the water falls at low speed from the distribution element 22, whereas the mass 16 is completely immersed in water.

When the water level of the aquarium decreases, the water level in the chamber 14 decreases accordingly, and the pump 19 reduces its capacity but never remains without water by virtue of the supply which flows through the bypass opening 21.

The decrease in the capacity of the pump 19 restores the level in the chamber 14.

As regards the mechanical-action filters, they are crossed by a flow of water at high speed, which is optimum for their best performance.

From what has been described above it is thus evident that the filtration due to the biological-action masses is independent of the emptyings, currently due to the action of timer-controlled devices, and fillings of the regions in which said masses are located.

This entails greater structural simplicity for the filter, as well as its better operation, considering the fact that part of the biological-action filtration masses is constantly subjected to an air-water exchange effect.

The recirculation pump operates constantly in water and is thus not exposed to the risk of wear or damage due to possible operation in air.

The constant operation of the pump in water also avoids the onset of noise.

In practice it has thus been observed that the aquarium filter according to the invention has achieved the intended aim and objects.

The invention thus conceived is susceptible to numerous modifications and variations, all of which are within the scope of the inventive concept.

All the details may furthermore be replaced with other technically equivalent elements.

In practice, the materials employed, so long as compatible with the contingent use, may be any according to the requirements.

I claim:

1. Aquarium filter comprising:
   a parallelepipedal body immersable in an aquarium, first and second partitions in said body;
   a first mechanical filtration region defined between one side of said body and said first partition including mechanical-action filtration masses, said first mechanical filtration region being connected by an opening on said one side of said body to said aquarium;
   a second biological-action filtration region defined between said first and second partitions including a chamber for biological-action filtration masses, said second region being downwardly provided with a collecting channel system; and
   a compartment defined between said second partition and an other side of said body opposite to said one side of said body and comprising a recirculating pump placed in said compartment in its upper part and an intake tube of said recirculating pump, connected to said collecting channel system;
   said first partition having an upper opening for supplying said biologic action filtration masses, and a lower bypass opening for connecting said first mechanical filtration region directly with said collecting channel system.

2. Aquarium filter according to claim 1, wherein a first one of said mechanical-action filtration masses, is made of coarse pore sponge and wherein a second one of said mechanical-action filtration masses is made of a material selected from a group consisting of natural sponge and synthetic sponge.

3. Aquarium filter according to claim 2, wherein said mechanical-action filtration masses comprise a third mass, said third mass being made of a material selected from a group consisting of carbon and peat.

4. Aquarium filter according to claim 1, wherein said first region comprises an empty chamber, said empty chamber being located adjacent said first partition.

5. Aquarium filter according to claim 1, wherein said first region comprises a space and a thermostat-controlled heater, said space being free from filtration masses, said thermostat-controlled heater being placed in said space.

6. Aquarium filter according to claim 1, wherein said second biological filtration region comprises a horizontal distribution element having an upwardly directed concavity, said distribution element being placed above said first biological action masses and connected to the first mechanical filtration region by said upper opening of said first partition, said distribution element being downwardly provided with perforations for distributing water arriving from said first region toward said biological-action filtration masses with a sprinkler-like effect.

7. Aquarium filter according to claim 6, wherein said biological-action filtration masses placed between said distribution element and said collecting channel system comprise an upper first biological-action filtration mass and a lower second biological-action filtration mass, said upper first biological-action filtration mass being made of ceramic sponge, said lower second biological-action filtration mass being made of sections of ceramic tubes.

8. Aquarium filter according to claim 7, wherein the cross-section of said bypass opening is such that the suction of the pump produces in said second biological-action region a fluid level which substantially corresponds to a separating region between said upper first biological-action mass and said lower second biological-action filtration mass.

9. Aquarium filter according to claim 1 wherein said first mechanical filtration region comprises perforated partitions, said perforated partitions separating said mechanical action filtration masses and being arranged vertically, whereby to allow water to flow horizontally through said mechanical-action filtration masses.

10. Aquarium filter according to claim 1 wherein said mechanical filtration region comprises meshed partitions, said meshed partitions separating said mechanical action filtration masses and being arranged vertically, whereby to allow water to flow horizontally through said mechanical-action filtration masses.

* * * * *